United States Patent

Herrera

[11] 3,883,283
[45] May 13, 1975

[54] FLOUR DOUGH SHEET FORMING AND CONVEYING SYSTEMS

[75] Inventor: Frank J. Herrera, Downey, Calif.

[73] Assignee: Casa Herrara, Inc., Los Angeles, Calif.

[22] Filed: May 29, 1973

[21] Appl. No.: 364,998

[52] U.S. Cl. .......................... 425/337; 198/220 BA
[51] Int. Cl. .............................................. A21c 3/02
[58] Field of Search .................. 425/337, 335, 456; 198/229, 233, 204, 28, 137, 220 BA

[56] References Cited
UNITED STATES PATENTS

| | | | |
|---|---|---|---|
| 787,273 | 4/1905 | Burns | 425/337 |
| 806,870 | 12/1905 | Burns | 425/337 |
| 821,860 | 5/1906 | Colborne et al. | 425/337 |
| 1,871,753 | 8/1932 | Smith | 425/337 |
| 2,551,849 | 5/1951 | Petrilli | 198/220 BA |
| 2,907,286 | 10/1959 | Ruiz | 425/337 |
| 3,055,318 | 9/1962 | Engels | 425/337 X |
| 3,301,378 | 1/1967 | Wayne et al. | 198/220 BA |
| 3,792,948 | 2/1974 | Martinez | 425/337 X |

*Primary Examiner*—Francis S. Husar
*Assistant Examiner*—David S. Safran
*Attorney, Agent, or Firm*—Benoit Law Corporation

[57] ABSTRACT

Apparatus for forming rounded flour dough sheets from flour dough patties have equipment for working flour dough patties into oval sheets of flour dough and equipment for conveying the oval sheets away from the first mentioned equipment. The latter equipment includes a first endless conveyor which is driven and mounted for conveyance of the oval sheets essentially in a first direction of advance. A second endless conveyor is mounted for conveyance of the oval sheets away from the previously mounted conveyor, essentially in a second direction of advance extending at an angle to the first direction of advance as seen in the direction of gravitational force acting on the oval sheets during conveyance.

A similar apparatus has a slide for the oval sheets and equipment for vibrating this slide for a conveyance of the oval sheets along the slide.

A similar apparatus has an endless conveyor web for conveying sheet-like material from a first location to a second location, an essentially sheet-like support located at least partially inside the endless conveyor web for supporting this endless conveyor web, and a blade connected to the latter support at the mentioned second location and projecting beyond the endless conveyor web at such second location.

A similar apparatus has an endless conveyor web for conveying sheet-like material on one side of the endless conveyor web, and equipment for imposing a variable convex curvature on the endless conveyor web at the mentioned one side where the pieces of sheet-like material are conveyed.

18 Claims, 12 Drawing Figures

FLOUR DOUGH SHEET FORMING AND CONVEYING SYSTEMS

BACKGROUND OF THE INVENTION

1. Field of the Invention

The subject invention relates primarily to food machinery and, more particularly, to flour dough sheet forming and conveying systems.

2. Description of the Prior Art

The preparation of many food products requires the working of flour dough into sheets. By way of example, flour dough has to be rolled into sheets in the preparation of pies as well as in the preparation of tortillas.

Machines have been built in the past which roll flour dough patties into rounded sheets with the aid of rollers (the word "patties" is employed herein in a broad sense, intended to cover not only flattened chunks or cakes of dough but also round or rounded dough balls).

Existing machinery of this type is either very expensive and complicated or has potential limitations that were not amenable to removal by conventional means or methods. For instance, the once-held belief that existing machinery which perform satisfactorily in a low to medium volume type of production could be adapted to high-volume production by an enlarged design of components did not materialize when put to practical tests. The consequences was potential malfunction and a production of tortillas or other flour dough sheets of uneven thickness and non-roundness.

In a similar vein, conventional equipment for conveying sheets of flour dough or other pieces of sheet-like material has proved inadequate for many tasks. In particular, conventional supports for endless conveyor webs and related equipment have imposed serious limitations on the design and construction of improved machinery. The same can be said with respect to the relatively stationary curvature or the lack of curvature that characterizes conventional conveying equipment.

SUMMARY OF THE INVENTION

It is an object of this invention to provide improved apparatus for forming rounded flour dough sheets from flour dough patties.

It is a related object of this invention to provide improved apparatus for forming rounded flour dough sheets from at least two flour dough patties simultaneously or in short succession.

It is a further object of this invention to provide improved apparatus for conveying pieces of sheet-like material. It is a related object of this invention to provide improved apparatus for conveying pieces of sheet-like material with the aid of an improved endless conveyor.

Other objects of this invention will become apparent in the further course of this disclosure.

From one aspect thereof, this invention resides in apparatus for forming rounded flour dough sheets from flour dough patties. The invention according to this aspect resides, more specifically, in the improvement comprising, in combination, first means for working flour dough patties into oval sheets of flour dough, second means for working said oval sheets of flour dough into rounded flour dough sheets, third means for conveying said oval sheets away from said first means, said third means including first endless conveying means having an endless conveyor web, means for mounting said first endless conveying means for the conveyance of said oval sheets essentially in a first direction of advance, said mounting means including an essentially sheet-like support located at least partially inside said endless conveyor web for supporting said endless conveyor web, and means for driving said first endless conveying means, said third conveying means further including a blade connected to said sheet-like support and located between said endless conveyor web and said second endless conveying means, and fourth means for conveying said oval sheets from said third means to said second means, said fourth means including second endless conveying means, means for mounting said second endless conveying means for conveyance of said oval sheets essentially in a second direction of advance extending at an angle to said first direction of advance as seen in the direction of gravitational force acting on said oval sheets during conveyance, and means for driving said second endless conveying means.

In a preferred embodiment of this invention, the apparatus includes fifth means for working further flour dough patties into further oval sheets of flour dough, and sixth means for guiding said further oval sheets away from said fifth means, said sixth means including third endless conveying means, means for mounting said third endless conveying means for conveyance of said further oval sheets to said second endless conveying means for further conveyance of said further oval sheets to said second means and for subsequent working of said further oval sheets by said second means into rounded flour dough sheets, and means for driving said third endless conveying means.

From a second aspect thereof, the invention resides also in apparatus for forming rounded flour dough sheets from flour dough patties. The invention according to this second aspect resides, more specifically, in the improvement comprising in combination, first means for working flour dough patties into oval sheets of flour dough, second means for working said oval sheets of flour dough into rounded flour dough sheets, third means for guiding said oval sheets away from said first means, said third means including a slide for said oval sheets and means for vibrating said slide for a conveyance of said oval sheets along said slide, and fourth means for conveying said oval sheets from said third means to said second means.

From a third aspect thereof, this invention resides in apparatus for conveying pieces of sheet-like material, and resides, more specifically, in the improvement comprising, in combination, an endless conveyor web for conveying said sheet-like material from a first location to a second location, means including an essentially sheet-like support located at least partially inside said endless conveyor web for supporting said endless conveyor web, a blade connected to said support at said second location and projecting beyond said endless conveyor web at said second location, and means for driving said endless conveyor web.

From a fourth aspect thereof, this invention resides in apparatus for conveying pieces of sheet-like material, and resides, more specifically in the improvement comprising, in combination, means including an endless conveyor web for conveying said sheet-like material on one side of said endless conveyor web, means for driving said endless conveyor web, and means for imposing a variable convex curvature on said endless conveyor web at said one side where said pieces of sheet-like material are conveyed.

While the subject invention is styled in terms of equipment for forming or conveying flour dough sheets, it should be understood that at least part of this equipment has utility for conveying pieces of sheet-like material other than flour dough sheets.

BRIEF DESCRIPTION OF THE DRAWINGS

The subject invention will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
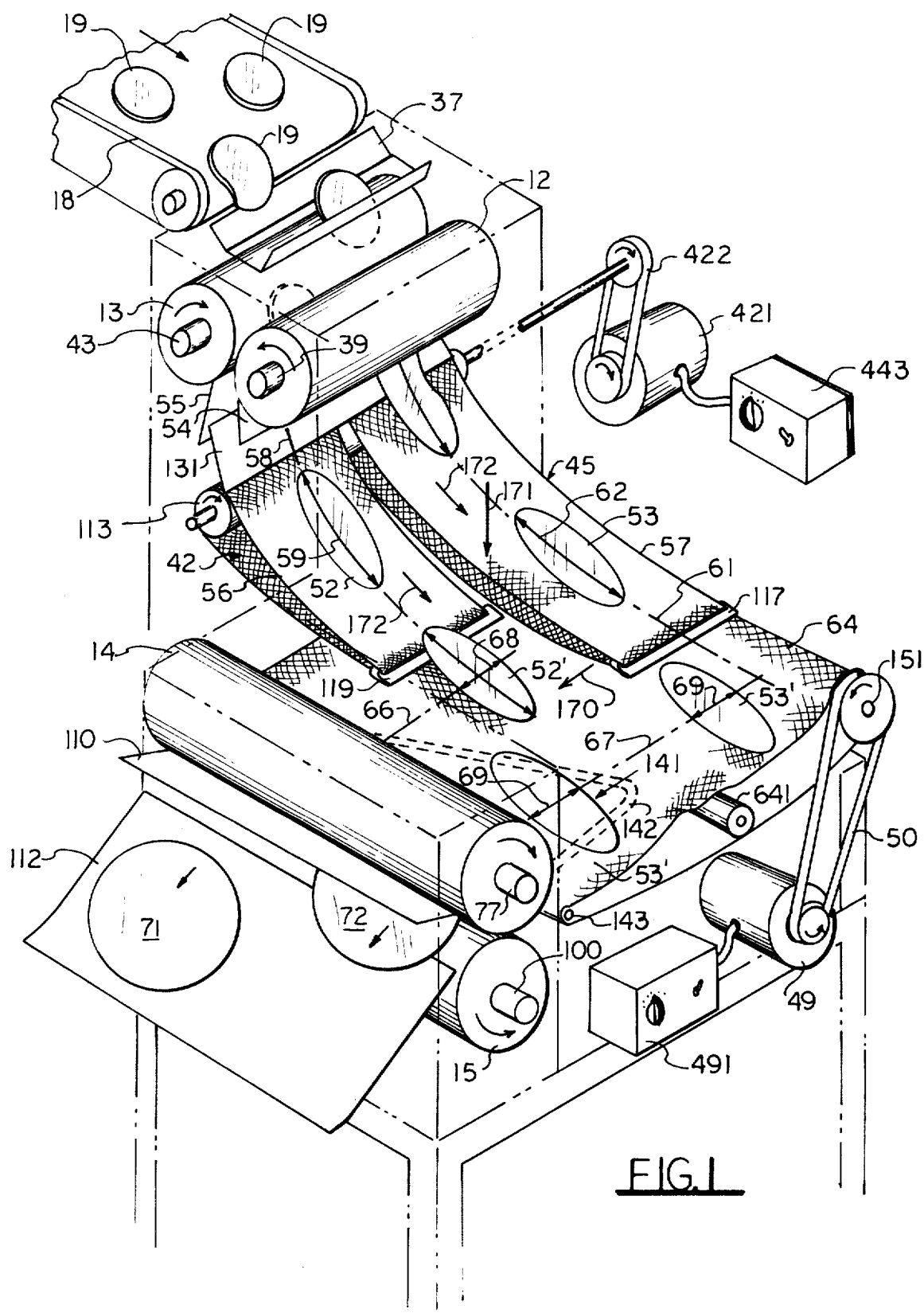
FIG. 1 is a perspective view of a machine for forming rounded flour dough sheets from flour dough patties, in accordance with a preferred embodiment of the subject invention.

The machines shown in the drawings are particularly suitable as so-called "flour heads" for making tortillas from flour dough patties. However, it should be understood that the subject invention may also be employed for making other types of rounded flour dough sheets, such as sheets for pizza pies as well as other kind of pies.

The tortilla flour head 10 has a pair of first or input rollers 12 and 13 and a pair of second output rollers 14 and 15. The flour head also has a superstructure 17 containing a conveyor 18 for transporting flour dough balls or patties 19 in pairs toward the input rollers 12 and 13 and an auxiliary conveyor 20 cooperating with the conveyor 18 for flattening the flour dough patties prior to rolling by the rollers 12 and 13.

The flour dough balls or patties which are manually or automatically applied in pairs to the conveyor 18 may be formed from flour dough by hand or by a machine. Conventional machines, such as "Union Bun Machines," exist for forming balls of dough from a mass of flour dough. In accordance with conventional practice the flour dough balls or patties 19 may be cured prior to application to the conveyor 18. In the case of tortilla manufacture, for instance, the dough balls or patties are subjected to so-called "proofing" prior to application to the conveyor 18. This is a subjection of the flour dough balls or patties to a controlled temperature and humidity environment for a predetermined period of time for the purpose of establishing the proper lightness of the dough. In some applications, it will be found that a flattening of the dough balls or patties prior to rolling is not necessary, or that a different type of conveyor or supply system could be used for supplying the dough balls or patties to the rollers 12 and 13. In the perspective view of FIG. 1, the feed direction for the conveyor 18 has been reversed for a better view of essential parts.

Figure 2:
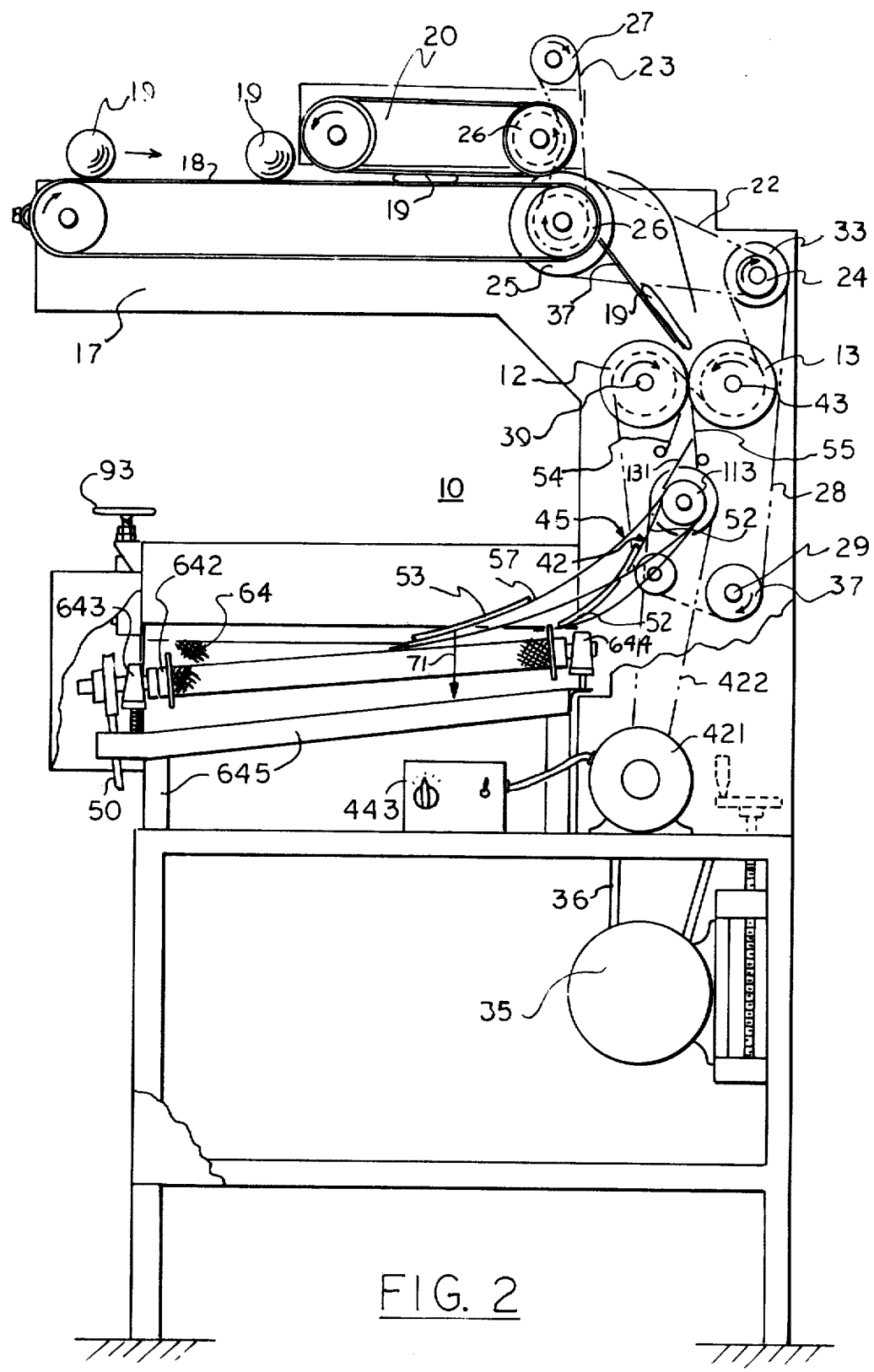
FIG. 2 is a side view, partially in section, showing a first side of the machine of FIG. 1.

The conveyors 18 and 20, if used, are driven with the aid of belt or chain transmissions 22 and 23 including pulleys 24, 25, 26 and 27 (see FIG. 2).

The input rollers 12 and 13 are driven by a chain or belt transmission 28 including pulleys 32 and 33. The pulley 32 sits on an output shaft 29 of a gear block 31 (see FIG. 3) which is driven by an electric motor 35 by way of a chain or belt transmission 36. The above mentioned pulley 24 is driven by the pulley 33.

A chute 37 guides the pressed dough patties 19 from the conveyor 18 to the input rollers 12 and 13.

Figure 3:
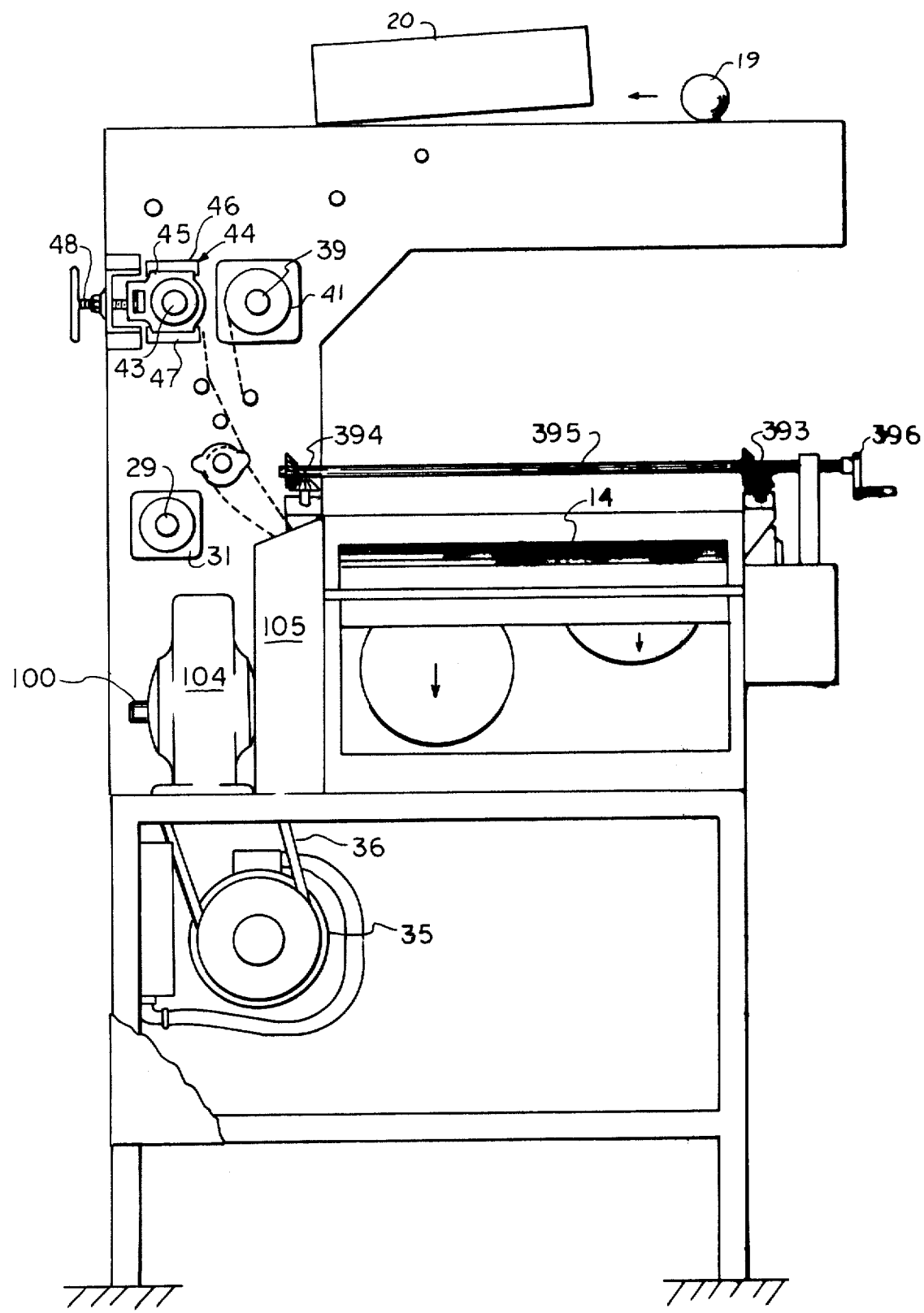
FIG. 3 is a side view, partially in section, showing the opposite side of the machine of FIG. 1.

The input roller 12 has a shaft 39 which is rotatably mounted by two bearings at opposite sides of the roller 12. One of these bearings is visible at 41, as seen in FIG. 3. The input roller 13 is rotatably mounted on a shaft 43 which, in turn, is mounted by two adjustable bearings at opposite sides of the roller 13. One of these bearings is seen at 44 in FIG. 3. The bearing 44 is of a jack screw type, having a bearing block 45 slidable on two rails 46 and 47 and a jack screw 48 for adjusting the spacing between the rollers 12 and 13 by adjusting the relative position of the bearing block 45. The bearing (not shown) at the other end of the shaft 43 is of the same design as the bearing 44.

At the beginning of a rolling operation, the spacing between the input rollers 12 and 13 is adjusted by adjustment of the bearing 44 and its counterpart at the other end of the shaft 43, so as to suitably adjust the thickness of the oval sheets of flour dough provided by the operation of the rollers 12 and 13 as mentioned below.

As seen in FIG. 1, the dough balls or patties 19 may be placed and flattened on the conveyor 18 in pairs. Processing of the patties in pairs doubles the output of the flour head and reduces the required capital investment significantly.

It is pointed out at this juncture that the expression "in pairs" as herein employed does not necessarily imply that the pairs of patties 19, or oval sheets rolled by the input rollers, or rounded sheets rolled by the output rollers are necessarily processed simultaneously. Rather, the pairs of patties 19 may be fed to the input rollers 12 and 13 in a staggered relationship and be processed through the flour head in a staggered relationship. In such staggered relationship, the patties in each pair arrive at the input rollers at different times, but still along laterally spaced paths. Similarly, the oval flour dough sheets in each pair arrive at the output rollers at different times, but still along laterally spaced paths. Also, the expression "in pairs" is not intended to preclude the rolling of further patties and oval sheets in addition to the pairs herein shown and described.

The input rollers 12 and 13 are of sufficient width to roll the flour dough patties 19 in pairs. The rollers rotate against each other to roll the pairs of flour dough patties 19 into pairs of oval sheets of flour dough 52 and 53. Scraping knives 54 and 55 cooperate with the rollers 12 and 13 to prevent the entrainment of dough by these rollers.

The pairs of oval sheets 52 and 53 are transported from the input rollers 12 and 13 to the output rollers 14 and 15. To this end, the apparatus 10 includes a pair of endless conveying means 42 and 45 including a pair of endless wire mesh conveyor belts 56 and 57. The conveyor 56 conveys the oval sheet 52, and each oval sheet succeeding it, along a path which in FIG. 1 is indicated by a phantom line 58 and which extends substantially parallel to a major axis 59 of the oval sheet 52. Similarly, the conveyor 57 conveys the oval sheet 53, and each oval sheet succeeding it, away from the rollers 12 and 13 in a further path indicated by a phantom line 61. The further path 61 is spaced from the path 58 and extends substantially parallel to a major axis 62 of the oval sheet 53. The conveying means 42 and 45 thus convey the oval sheets 52 and 53 in a first direction of advance along the paths 58 and 61.

The apparatus 10 further includes a conveyor 64 for transporting the oval sheets 52 and 53 to the output rollers 14 and 15. The conveyor 64 may be of a meshed wire type and may be driven by a motor 49 with the aid of a conventional belt transmission 50 (see FIG. 1).

The conveying means 42 and 45 convey the oval sheets 52 and 53 onto the conveyor 64. As indicated with the aid of oval sheets 52' and 53' the conveyor 64 transports the oval sheets along paths 66 and 67 which are spaced from each other and which extend substantially parallel to minor axes 68 and 69 of the oval sheets. In the illustrated preferred embodiment, the paths 66 and 67 extend substantially at right angles to the paths 58 and 61. In general terms, however, and in accordance with the broad principle of the subject invention, the conveyor 64 includes means, such as shafts, rollers mounting blocks, and supports 642, 643, 644 and 645, respectively, for mounting the belt or wire mesh of the endless conveyor 64 for conveyance of the oval sheets 52, 53, 52',53', et seq. essentially in a second direction of advance, of which the illustrated direction 170 is a special case. In general terms, the latter second direction of advance extends at an angle to a first direction of advance as seen in the direction of gravitational force 171 acting on the advancing oval sheets during conveyance. The latter first direction of advance is the direction 172 at which the oval sheets are conveyed by the conveying means 42 and 45.

In accordance with the latter broad principle of the subject invention, the paths 58 and 66 and 61 and 67 may extend one to another at angles other than 90 degrees as long as the latter angular relationship of the advance directions 170 and 172 as seen in the direction of gravitational force 171 is preserved. In this respect, an angle of 180° is considered a straight line and not an angle within the scope of the latter definition.

An angle of essentially 90° between the advance directions 170 and 172 is herein preferred, whereby the rollers 14 and 15 will extend the minor axes of the oval sheets 52 and 53, et seq., in order to produce rounded flour dough sheets 71 and 72. However, the roundness of the sheets 71 and 72, or other desired shapes, can be achieved with angles other than 90° between the advance directions 170 and 172.

For instance, the shape of the rolled sheets 71 and 72 depends also on the degree of rotation imposed on the oval sheets 52 and 53 in their transition from the conveying means 42 and 45 to the conveyor 64. This degree of rotation, as seen in the direction of gravitational force 171, is a rather complex function of the relative speeds of the conveying means 42 and 45 to the conveyor 64.

Accordingly, and in accordance with a preferred embodiment of the subject invention, the conveying means 42 and 45 are operated by a separate drive including a motor 421, a belt or chain-type transmission 442 and a motor control 443. The motor 49 for driving the lower conveyor 64, on the other hand, has its speed controlled by a separate motor control 49. Since the motors 49 and 421 are thus independently speed controllable, it follows that the respective drives for the conveyor means 42 and 45 and for the conveyor 64 will vary the speed of operation of the conveyor means 24 and 45 relative to the speed of operation of the conveyor 64 and vice versa, as required for a perfection of the roundness of the rolled sheets 71 and 72 or as required for the accomplishment of another desired shape.

The output rollers 14 and 15 are of sufficient width to roll in pairs the oval sheets transported to it by the conveyor 64. When the oval sheets 52 and 53 or 52' and 53' arrive at the output rollers 14 and 15, the dough in these sheets is characterized by a high firmness. The dough in the oval sheets accordingly exert high separating forces on the rollers 14 and 15 during the rolling of the dough into the rounded sheets 71 and 72.

While these problems can be adequately handled by eccentric types of roller adjusing mechanisms when the rollers are relatively short, it has been found that these types of adjusting mechanism are incapable of providing and maintaining the required spacing between the rollers 14 and 15 with the requisite amount of precision when pairs of oval sheets are to be rolled. The rolled sheets 71 and 72 leave the output roller with uneven thickness and roundness when conventional equipment for adjusting the output rollers is used.

In contrast thereto, flour dough sheets 71 and 72 processed in accordance with the subject invention are characterized by sutstantially improved uniformity in thickness and roundness.

According to the illustrated embodiment, the output rollers 14 and 15 are provided with adjusting means for adjusting these rollers always in parallel relationship to one another throughout a range of adjustment, and the spacing between the output rollers 14 and 15 is effected with these adjusting means only uniformly throughout the width of these rollers 14 and 15 for uniformly adjusting the thickness and also the roundness of the rounded flour dough sheets 71 and 72.

Figure 4:
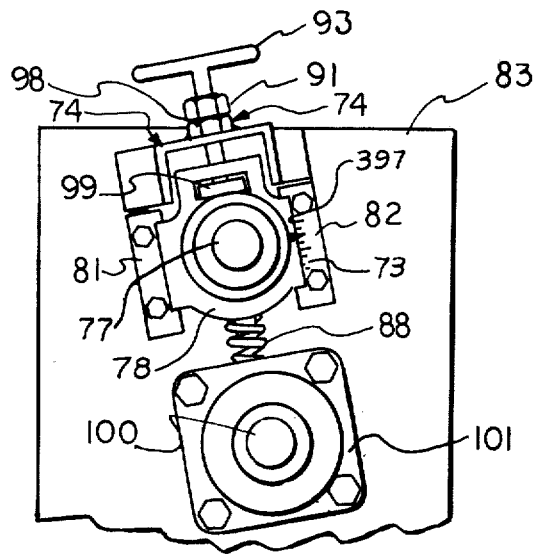
FIGS. 4 and 5 are an elevation and a side view, on enlarged scales, of roller adjustments employed in the machine of FIG. 1.
Figure 5:
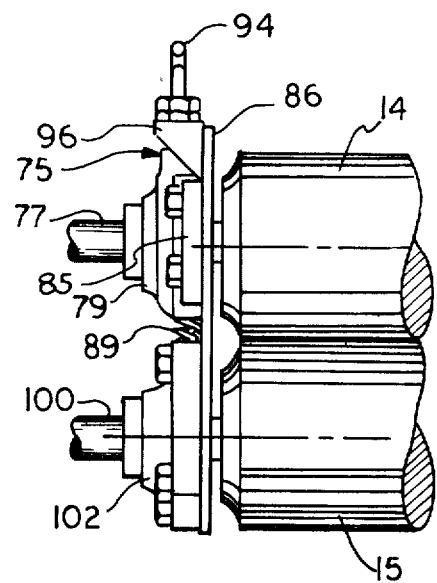

As seen in FIGS. 4 and 5, the adjusting equipment for the output rollers 14 and 15 includes a first adjusting mechanism 74 coupled to at least one of the output rollers on one side of the output rollers for adjusting the spacing between the output rollers at that one side, and a second adjusting mechanism 75 coupled to at least that one roller but on the opposite side of the output rollers 15 and 15 for adjusting the space in between these output rollers at the opposite side by amounts of adjustment corresponding to amounts of adjustment effected at the mentioned one side by the first adjusting mechanism 74.

It will be recognized at this juncture that the above mentioned feature of adjusting the spacing between the output rollers 14 and 15 only uniformly throughout the width of these output rollers does not imply that these rollers are necessarily adjusted only by a simultaneous actuation of the adjusting mechanisms 74 and 75. Rather, the mechanism 74 and 75 can be actuated alternatively or one after another, as long as the net result of an adjustment operation is a uniform adjustment throughout the width of the rollers 14 and 15.

In accordance with a preferred embodiment of the subject invention, the roller 14 has a shaft 77 which is rotatably mounted by a bearing 78 at one side of the rollers and a bearing 79 at the opposite side of the roller 14. The bearing 78 is slidable along stationary rails 81 and 82 which are attached to a stationary part 83 of the flour head 10. Similarly, the bearing 79 is slidable along a pair of stationary rails, one of which is seen in FIG. 5 at 85. The latter rails are attached to a stationary part 86 of the flour head 10.

In the preferred illustrated embodiment of the subject invention, the output rollers 14 and 15 are biased away from each other by a pair of springs 88 and 89 acting on the slidable bearings 78 and 79. Similar springs (not shown) may be employed at the bearings for the shaft 43 of the upper rollers 13. These springs also prevent roller impact.

Also in accordance with the illustrated preferred embodiment of the subject invention, the adjusting device 74 has a threaded member or jack screw 91, and the adjusting device 75 has a threaded member or jack screw 92. The jack screw 91 has a handle 93 for actuating the adjusting device 74, and the jack screw 92 has a handle 94 for actuating the adjusting device 75.

Moreover, the jack screw 91 is threaded into a yoke 95, and the jack screw 92 is threaded into a yoke 96. The yoke 95 is stationary and is attached to the stationary part 83 of the flour head. Similarly, the yoke 96 is stationary and is attached to the stationary part 86 of the flour head.

When the jack screws 91 and 92 are manually rotated in a first sense, the bearing 78 and 79 are advanced along the associated rails against the bias of the spring 88 and 89. In this manner, the spacing between the rollers 14 and 15 is reduced. If the handles 93 and 94 are rotated by equal angular amounts in the same sense either simultaneously or successively, the spacing between the rollers 14 and 15 is adjusted only uniformly throughout the width of these rollers.

If the handles 93 and 94 are rotated in the other sense of rotation (opposite to said first sense), then the springs 88 and 89 will push the bearings 78 and 79 along the associated rails so that the spacings between the rollers 14 and 15 is increased. Again, if the handles 93 and 94 are rotated in the same sense and by equal net amounts, either simultaneously or successively, then the resulting adjustments between the output rollers 14 and 15 are only uniform along the width of the rollers.

Figure 6:
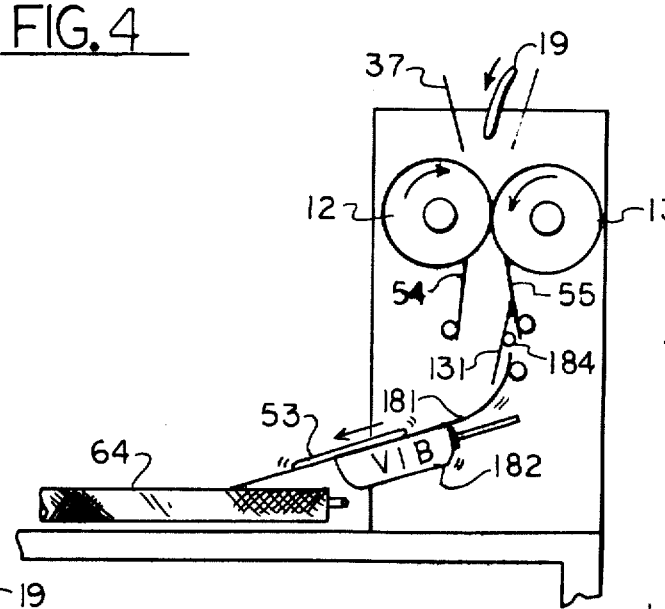
FIG. 6 is a side view, similar to a detail of the side view according to FIG. 2, and on a smaller scale, of a modification of the machine of FIG. 1.

As seen at 98 of FIG. 6, locking nut may be provided for each jack screw to fix an effected adjustment. As further seen at 99 in FIG. 6, each jack screw may be provided with a collar at the end thereof for not only pushing the bearing 78 downwardly, but also lifting the bearing 78 upwardly as seen in FIG. 6. Similar constructions may be used for the bearings of the shaft 43 of the upper roller 13.

In the preferred illustrated embodiment, the lower roller 15 has a shaft 100 which is rotatably mounted in a stationary bearing 101 on one side of the roller 15 and in a stationary bearing 102 on the other side of the roller 15. The motor 35 drives a gear block 104 which, in turn, drives the rollers 14 and 15 through a conventional gear box 105 which may include gear wheels (not shown) on the roller shafts 77 and 100 and a chain transmission (not shown) between these gear wheels for driving the rollers 14 and 15 in unison.

In contrast to the above mentioned traditional adjusting equipment, it has been found that the adjusting equipment according to the subject invention is well capable of adjusting the spacing between the output rollers 14 and 15 with the required degree of precision. Equally important, the adjusting equipment according to the subject invention is further capable of accurately maintaining effected adjustments of the output rollers against the firmness of the dough in the oval sheets 52 and 53 or 52' and 53'. This is particularly important in the case of tortilla manufacture. In that case, the output rollers 14 and 15 have the task of rolling a very firm dough into paper-thin rounded sheets or tortillas which, in accordance with conventional practice, are subsequently baked in an oven. As seen in FIG. 3, the jack screws 93 and 94 (FIGS. 4 and 5) may be replaced by mitre gears 393 and 394 for a joint adjustment of the bearings 78 and 79 through a shaft 395 driven by a hand crank 396. As seen in FIG. 4, a pointer and scale device may be provided for indicating the spacing between the rollers.

Scraping knives 110 and 112 cooperate with the rollers 14 and 15 to prevent the entrainment of dough by these rollers. The scrapping knife 112 may have the form of a slide for delivering the rolled sheets 71 and 72 to a suitable conveyor (not shown) for further processing of the dough sheets.

As best seen in FIG. 1, the endless conveyor 56 has an effective length sufficient to deposit oval sheets 52 guided away from the rollers 12 and 13 at a first location on the lower conveyor 64, occupied in FIG. 1 by the oval sheet 52'. The endless conveyor 57 has an effective length sufficient to deposit oval sheets 53 guided away from the rollers 12 and 13 onto the lower conveyor 64 at a second location different from the mentioned first location and occupied, in FIG. 1, near the intersection of the phantom lines 61 and 67. The conveyors 56 and 57 are jointly driven by the motor 41 by way of the transmission 422 and roller 113.

In this manner, the flour head 10 is capable of rolling and conveying the flour dough sheets in pairs.

Figure 12:
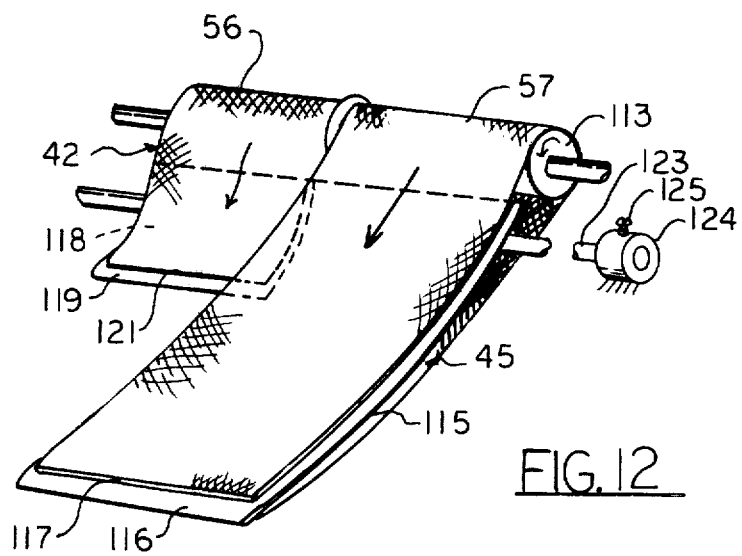
FIG. 12 is a perspective view of conveyor equipment employed in the apparatus of FIG. 1.

As best seen in FIG. 12, the conveyor means 45 include a sheet-like support 114 for the endless conveyor 57. A miniature slide or blade 116 is connected to the support 115 either by conventional fastening means (not shown) or by being made integral with the support 115. The blade 116 is ahead of the endless conveyor 57 and an elongate aperture 117 between the supports 115 and 116 permits the endless conveyor web 57 to travel past the blade 116. The conveyor means 42 have a similar sheet-like support 118 and a miniature slide or blade 119, as well as a miniature aperture 121 permitting the endless conveyor web 56 to travel past the blade 119.

The sheet-like supports 115 and 118 are welded or otherwise fastened to a shaft 123, opposite ends of which are held into adjustable supports, one of which is seen in FIG. 12 at 124. By way of example, the support 124 may have a locking screw 125 for adjustably arresting the level of the blades 117 and 119 at any desired distance relative to the lower conveyor 64.

As seen in FIG. 1, the miniature slides or blades 117 and 119 are effectively located between the conveyor web 56 and the lower conveyor 64 and the conveyor web 57 and lower conveyor 64, respectively. In this manner, the transition of the oval flour dough sheets between the upper and lower conveying means is facilitated. In particular, the danger of flour dough sheets being drawn in between the upper and lower conveying means is eliminated. At the same time, the upper conveying means 42 and 45 are effectively supported at the above mentioned first and second locations relative to the lower conveyor 64, without objectionable scraping of the lower conveyor against the upper conveyors.

Transition of dough sheets between the upper rollers 13 and 14 and the conveyors 56 and 57 is facilitated by an upper slide 131 which guides the emerging flour dough sheets away from the upper rollers and onto the conveyors 56 and 57.

In accordance with a further feature of the subject invention, the flour head 10 has means for varying the curvature of at least one of the endless conveying means. These curvature varying means may be employed in endless conveyors quite independently of the other features herein disclosed.

Figure 8:
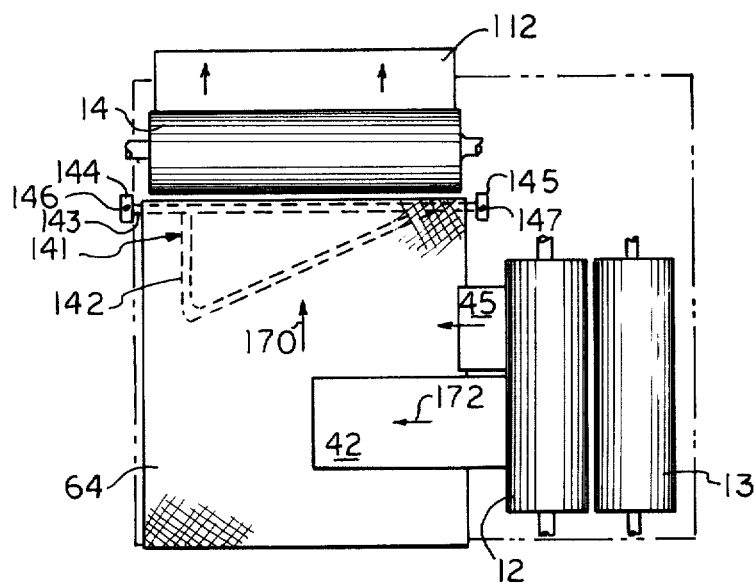
FIGS. 8, 9 and 10 are top views on a reduced scale of the machine of FIG. 1, illustrated further modifications of the subject invention.
Figure 11:
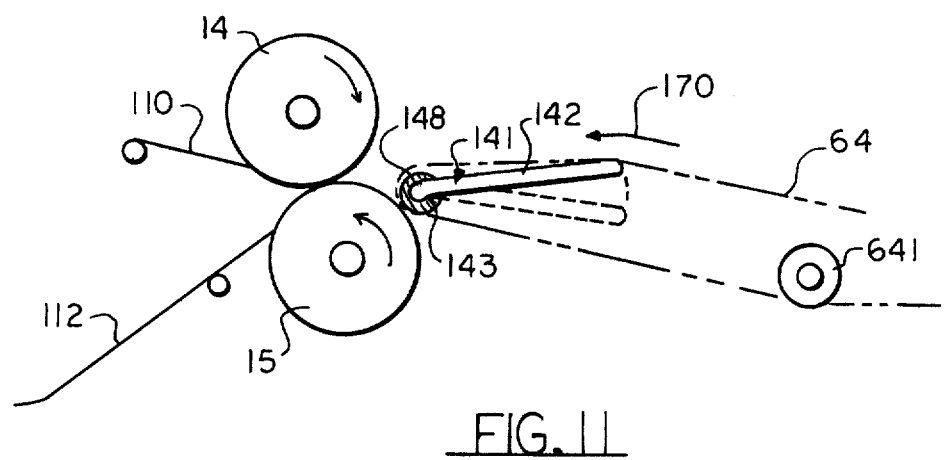
FIG. 11 is a side view of part of the machine of FIG. 8.

In the illustrated preferred embodiment, the lower conveyor 64 has means 141, best seen in FIGS. 1, 8 and 11 for imposing a variable convex curvature on the conveyor 64. By way of example, the curvature imposing means 141 include a triangular rod 142 located inside the conveyor 46 and attached to a shaft 143, opposite ends of which are adjustably held in two supports 144 and 145 which have locking screws 146 and 147 for releasably retaining the shaft 43 in any desired angular position. The shaft 143 may carry a roller or other cylindrical means 148 for permitting sliding movement of the conveyor 64 relative to the shaft 143.

The curvature of the conveyor 64 between the supporting shafts 143 and 151 is adjusted by varying the altitude of the apex of the triangular rod 142.

Conveyor curvature adjustments according to the subject invention are very important and beneficial in practice. In particular, these curvature adjustments permit an exact adjustment of the angle of the conveyed flour dough sheets relative to the output rollers 14 and 15. It has also been confirmed in practice that these curvature adjustments permit a regulation of the rotation of the conveyed flour dough sheets relative to axes parallel to the gravitational force direction 171. These adjustments and regulatory actions permit an optimization of the configurational qualities of the rolled flour dough sheets 171 and 172 under different conditions of dough moisture, weight and quality and under different relative conveying velocities.

Figure 9:
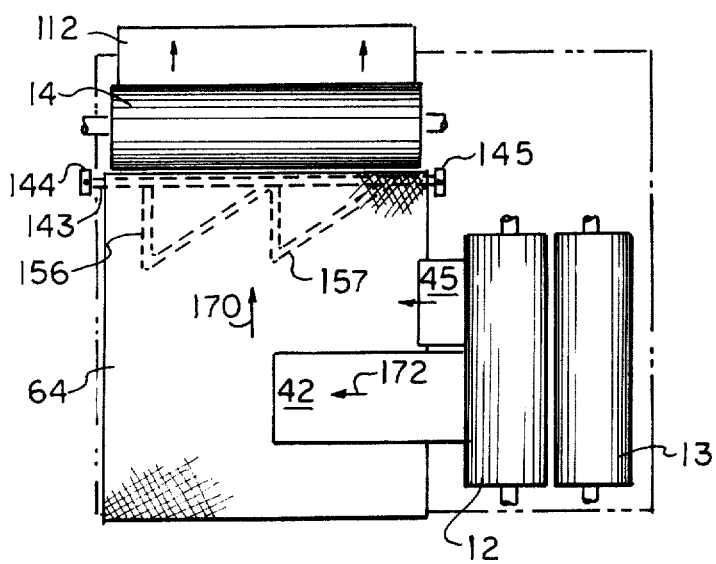

According to the preferred embodiment of the subject invention shown in FIG. 9, the conveyor curvature adjusting means include a pair of triangular rods 156 and 157 defining two apices for engaging the lower conveyor 64, with a first apex engaging the conveyor 64 at a first location, and a second apex engaging the conveyor 64 at a second location spaced from the first location. As before, the shaft 143 and supports 144 and 145 adjustably support the curvature and varying means.

The presence of two engaging apices increases the versatility of the curvature adjustment for the accommodation of both flour dough sheets in each pair. If desired, the triangular structure 157 may be made independently adjustable from the triangular structure 156 for an independent handling of the two sheets in each pair.

Figure 10:
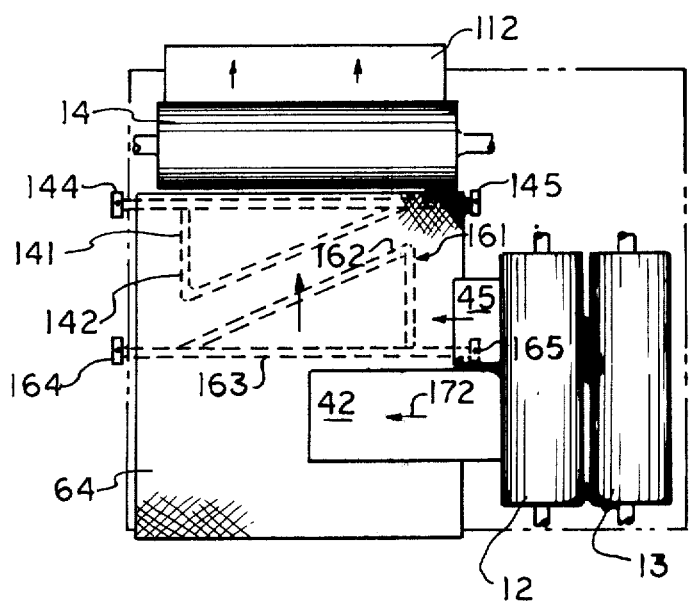

The preferred embodiment shown in FIG. 10 employs the above mentioned adjustable curvature means 141 including the triangular structure 142 and an independently adjustable similar curvature imposing means 161 having a triangular rod 162 attached to a shaft 163 mounted in adjustable supports 164 and 165. In this manner, the curvature affecting one of the flour dough sheets in each pair can easily be adjusted independently of the conveyor curvature affecting the other flour dough sheet in each pair. This leads to an optimum uniform quality among both flour dough sheets in each pair upon the processing thereof by the output rollers 14 and 15.

In the embodiment shown in FIGS. 1, 2, 3, 8, 9, 10 and 12, the conveyor means 42 and 45 are parallel and arranged side-by-side of each other. According to the preferred embodiment shown in FIG. 7, the conveying means 42 and 45 extend from different sides onto the lower conveyor 64 to deposit elongate flour dough sheets 52 and 53 thereon.

Figure 7:
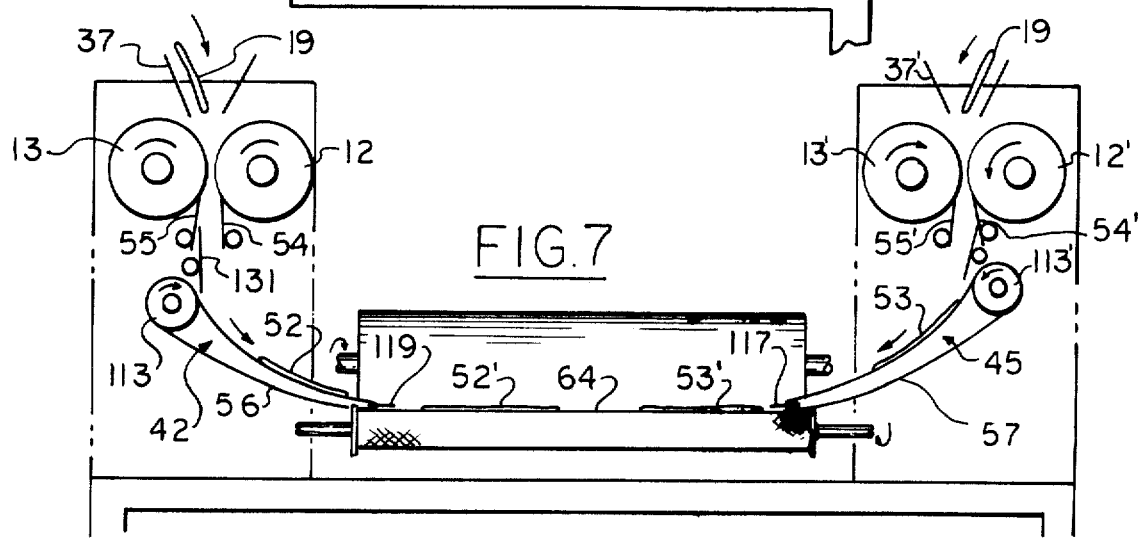
FIG. 7 is an elevation, on a reduced scale, of a further modification of the machine of FIG. 1.

This necessitates a duplication of the input rollers and of certain associated parts which, in FIG. 7, are indicated by the same reference numerals as the originally disclosed parts, except for the addition of a prime ('). If desired, the conveying means 42 and 45 may be collectively considered as upper conveying means in contradistinction to the lower conveying means 64, or maybe considered as first and second distinct conveying means. In either case, the conveying means 42 and 45 may either be driven collectively or then independently at different relative speeds. The embodiment of FIG. 7 is, for instance, advantageous if there are two operators or two conveyors for feeding the flour head with dough balls or patties 19. By way of example, two union bun machines and two proofers could then be employed for increased production capacity.

In accordance with a preferred embodiment of FIG. 6, the endless conveying means 45 is replaced by a sheet-like curved slide 181 which is vibrated by a conventional electrical vibrator 182 attached to the sheet 181. The sheet 181 is mounted at its upper edge of a rod 184 which may be similar in configuration and nature to the mounting shaft 123 shown in FIG. 12.

A vibrating slide arrangement similar to the vibrating slide arrangement shown in FIG. 6 may be employed to replace the upper conveying means 42. By the same token, a vibrating slide arrangement may be employed in lieu of the lower conveyor 64. In accordance with conventional practice, the vibrations imposed on the slides may be adjustable, in particular in terms of amplitude, to impart the desired conveying characteristics on the associated slides. Alternatively, the lower conveyor 64 may be employed in combination with vibratory upper slides and may be equipped with the curvature regulating means shown in any of the FIGS. 8 to 10.

At the present state of technology, the upper endless conveying means 42 and 45 are substantially preferred over vibrating slides for their greater potential adjustability and versatility. However, vibratory slides are potentially less expensive and simpler to manufacture and maintain.

While specific embodiments have been disclosed herein, variations and modifications within the spriit and scope of the subject invention will become apparent to those skilled in the art from the subject disclosure.

We claim:

1. In apparatus for forming rounded flour dough sheets from flour dough patties, the improvement comprising in combination:
   first means for working flour dough patties into oval sheets of flour dough;
   second means for working said oval sheets of flour dough into rounded flour dough sheets;
   third means for conveying said oval sheets away from said first means, said third means including first endless conveying means having an endless conveyor web, means for mounting said first endless conveying means for conveyance of said oval sheets essentially in a first direction of advance, said mounting means including an essentially sheet-like support located at least partially inside said endless conveyor web for supporting said endless conveyor web, and means for driving said first endless conveying means, said third conveying means further including a blade connected to said sheet-like support so as to form an aperture therebetween through which said endless conveyor passes said oval sheets from said third means to said second means, said fourth means including second endless conveying means, means for mounting said second endless conveying means for conveyance of said oval sheets essentially in a second direction of advance extending at an angle to said first direction of advance as seen in the direction of gravitational force acting on said oval sheets during conveyance, and means for driving said second endless conveying means.

2. An improvement as claimed in claim 1, wherein: said fourth means include means for mounting said second endless conveying means for conveyance of said oval sheets in a second direction of advance extending essentially at a right angle to said first direction of advance.

3. An improvement as claimed in claim 1, wherein: at least one of said driving means includes means for varying the speed of operation of one of said first and second endless conveying means relative to the speed of operation of the other of said first and second endless conveying means.

4. An improvement as claimed in claim 1, wherein: said means for driving said first endless conveying means includes means for varying the speed of operation of said first endless conveying means independently of the speed of operation of said second endless conveying means.

5. An improvement as claimed in claim 1, including in said combination:
   means for varying the curvature of at least one of said endless conveying means.

6. An improvement as claimed in claim 1, wherein: at least one of said endless conveying means includes an endless wire mesh conveying means.

7. An improvement as claimed in claim 1, wherein: said first endless conveying means includes at least one endless wire mesh conveying means; and said second endless conveying means includes an endless wire mesh conveying means.

8. An improvement as claimed in claim 1, wherein: said first endless conveying means includes a first endless conveyor having an effective length sufficient to deposit oval sheets guided away from said first means onto said second endless conveying means at a first location, and a second endless conveyor having an effective length sufficient to deposit oval sheets guided away from said first means onto said second endless conveying means at a second location different from said first location.

9. An improvement as claimed in claim 1, wherein: said first endless conveying means includes a first endless wire mesh conveyor having an effective length sufficient to deposit oval sheets guided away from said first means onto said second endless conveying means at a first location, and a second endless wire mesh conveyor having an effective length sufficient to deposit oval sheets guided away from said first means onto said second endless conveying means at a second location different from said first location.

10. An improvement as claimed in claim 9, wherein: said means for driving said first endless conveying means includes means for jointly driving said first and second wire mesh conveyors of said first endless conveying means.

11. An improvement as claimed in claim 9, wherein: said means for driving said first endless conveying means include means for varying the speed of operation of said first and second wire mesh conveyors independently of the speed of operation of said second conveying means.

12. An improvement as claimed in claim 1, wherein: said sheet-like support has an elongate aperture for passage of said conveyor web past said blade located between said endless conveyor web and said second endless conveying means.

13. An improvement as claimed in claim 1, wherein: said first endless conveying means include a first endless conveyor web for conveying oval sheets to said second endless conveying means at a first location and means for supporting said first endless conveyor web at said first location, and a second endless conveyor web for conveying oval sheets to said second endless conveying means at a second location different from said first location, and means for supporting said second endless conveyor web at said second location.

14. An improvement as claimed in claim 13, including:
   first sheet-like means connected to said means for supporting said first endless conveyor web and having a blade located between said first endless conveyor web and said second endless conveying means; and
   second sheet-like means connected to said means for supporting said second endless conveyor web and having a blade located between said second endless conveyor web and said second endless conveying means.

15. An improvement as claimed in claim 1, wherein: said first means include a first pair of adjustable rollers for rolling flour dough patties into oval sheets of flour dough.

16. An improvement as claimed in claim 15, wherein:

said second means include a second pair of adjustable rollers for rolling oval sheets of flour dough into rounded flour dough sheets.

17. An improvement as claimed in claim 1, including in said combination:

fifth means for working further flour dough patties into further oval sheets of flour dough; and sixth means for guiding said further oval sheets away from said fifth means, said sixth means including third endless conveying means, means for mounting said third endless conveying means for conveyance of said further oval sheets to said second endless conveying means for further conveyance of said further oval sheets to said second means and for subsequent working of said further oval sheets by said second means into rounded flour dough sheets, and means for driving said third endless conveying means.

18. An improvement as claimed in claim 17, wherein:

said means for mounting said first endless conveying means include means for mounting said first endless conveying means for conveyance of oval sheets of flour dough from a region adjacent one side of said second endless conveying means; and said means for mounting said third endless conveying means include means for mounting said third endless conveying means for conveyance of said further oval sheets from a region adjacent a side of said second endless conveying means opposite said one side.

* * * * *